(12) United States Patent
Glenn et al.

(10) Patent No.: US 12,411,769 B2
(45) Date of Patent: Sep. 9, 2025

(54) SOFTWARE CODE CACHING IN GATEWAY DEVICES DEPLOYED IN INFORMATION TECHNOLOGY INFRASTRUCTURE ENVIRONMENTS

(71) Applicant: Dell Products L.P., Round Rock, TX (US)

(72) Inventors: Jeffrey Teel Glenn, Pflugerville, TX (US); Matthew Gregory Puerkel, Minneapolis, MN (US); Sheetal Kuber Pattankude, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 188 days.

(21) Appl. No.: 18/242,338

(22) Filed: Sep. 5, 2023

(65) Prior Publication Data

US 2025/0077431 A1    Mar. 6, 2025

(51) Int. Cl.
| | |
|---|---|
| *H04L 29/06* | (2006.01) |
| *G06F 8/65* | (2018.01) |
| *G06F 9/445* | (2018.01) |
| *G06F 12/0837* | (2016.01) |
| *H04L 29/08* | (2006.01) |
| *G06F 3/04817* | (2022.01) |

(52) U.S. Cl.
CPC ...... *G06F 12/0837* (2013.01); *G06F 3/04817* (2013.01); *G06F 8/65* (2013.01)

(58) Field of Classification Search
CPC ............... G06F 12/0837; G06F 8/65
See application file for complete search history.

(56) References Cited

U.S. PATENT DOCUMENTS

| | | | |
|---|---|---|---|
| 2012/0124298 A1* | 5/2012 | Martin | G06F 12/0815 711/141 |
| 2015/0089577 A1* | 3/2015 | Beckman | H04L 63/02 726/1 |
| 2019/0130045 A1* | 5/2019 | Jindal | G06F 15/17331 |

OTHER PUBLICATIONS

Zhan Shi et al., Applying Deep Learning to the Cache Replacement Problem, Oct. 12-16, 2019, [Retrieved on Jun. 6, 2025]. Retrieved from the internet: <URL: https://dl.acm.org/doi/pdf/10.1145/3352460.3358319> 13 Pages (413-425) (Year: 2019).*

(Continued)

*Primary Examiner* — Anibal Rivera
(74) *Attorney, Agent, or Firm* — Ryan, Mason & Lewis, LLP (57) ABSTRACT

An apparatus includes at least one processing device configured to receive, at a gateway device deployed in an information technology (IT) infrastructure environment from a given IT asset, a request for software code. The processing device is also configured to download the requested software code from a backend server responsive to determining that it is not cached locally in a software cache of the gateway device, and to provide the requested software code to the given IT asset. The processing device is further configured to determine, utilizing one or more machine learning algorithms, a priority of the requested software code relative to other software code cached locally in the software cache. The processing device is further configured to implement a cache replacement algorithm for the software cache of the gateway device based at least in part on the determined priority of the requested software code.

20 Claims, 8 Drawing Sheets

(56) References Cited

OTHER PUBLICATIONS

T. Meskill, "Dail Motion to Pause Construction of Data Centres," https://www.rte.ie/news/2021/0929/1249672-data-centres/, Sep. 29, 2021, 4 pages.

R. Uria-Martinez et al., "U.S. Hydropower Market Report," Jan. 2021, 158 pages.

Z. Shi et al., "Applying Deep Learning to the Cache Replacement Problem," Proceedings of the 52nd Annual IEEE/ACM International Symposium on Microarchitecture, Oct. 2019, pp. 413-425.

S. Sethumurugan et al., "Designing a Cost-Effective Cache Replacement Policy using Machine Learning," IEEE International Symposium on High-Performance Computer Architecture, Apr. 2021, 13 pages.

L. V. Rodriguez et al., "Learning Cache Replacement with CACHEUS," 19th USENIX Conference on File and Storage Technologies, Feb. 2021, pp. 341-354.

* cited by examiner

SOFTWARE CODE CACHING IN GATEWAY DEVICES DEPLOYED IN INFORMATION TECHNOLOGY INFRASTRUCTURE ENVIRONMENTS

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices. Support platforms may also provide functionality for testing managed computing devices.

SUMMARY

Illustrative embodiments disclosed herein provide techniques for software code caching in gateway devices deployed in information technology infrastructure environments.

In one embodiment, an apparatus comprises at least one processing device that includes a processor coupled to a memory. The at least one processing device is configured to receive, at a gateway device deployed in an information technology infrastructure environment from a given one of a plurality of information technology assets in the information technology infrastructure environment, a request for software code. The at least one processing device is also configured to download, from a backend server outside the information technology infrastructure environment, the requested software code responsive to determining that the requested software code is not cached locally in a software cache of the gateway device, and to provide, to the given information technology asset, the requested software code. The at least one processing device is further configured to determine, utilizing one or more machine learning algorithms in a machine learning system implemented by the processor and the memory of the at least one processing device, a priority of the requested software code relative to other software code cached locally in the software cache of the gateway device. The at least one processing device is further configured to implement a cache replacement algorithm for the software cache of the gateway device, the cache replacement algorithm being based at least in part on the determined priority of the requested software code relative to the other software code cached locally in the software cache of the gateway device.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
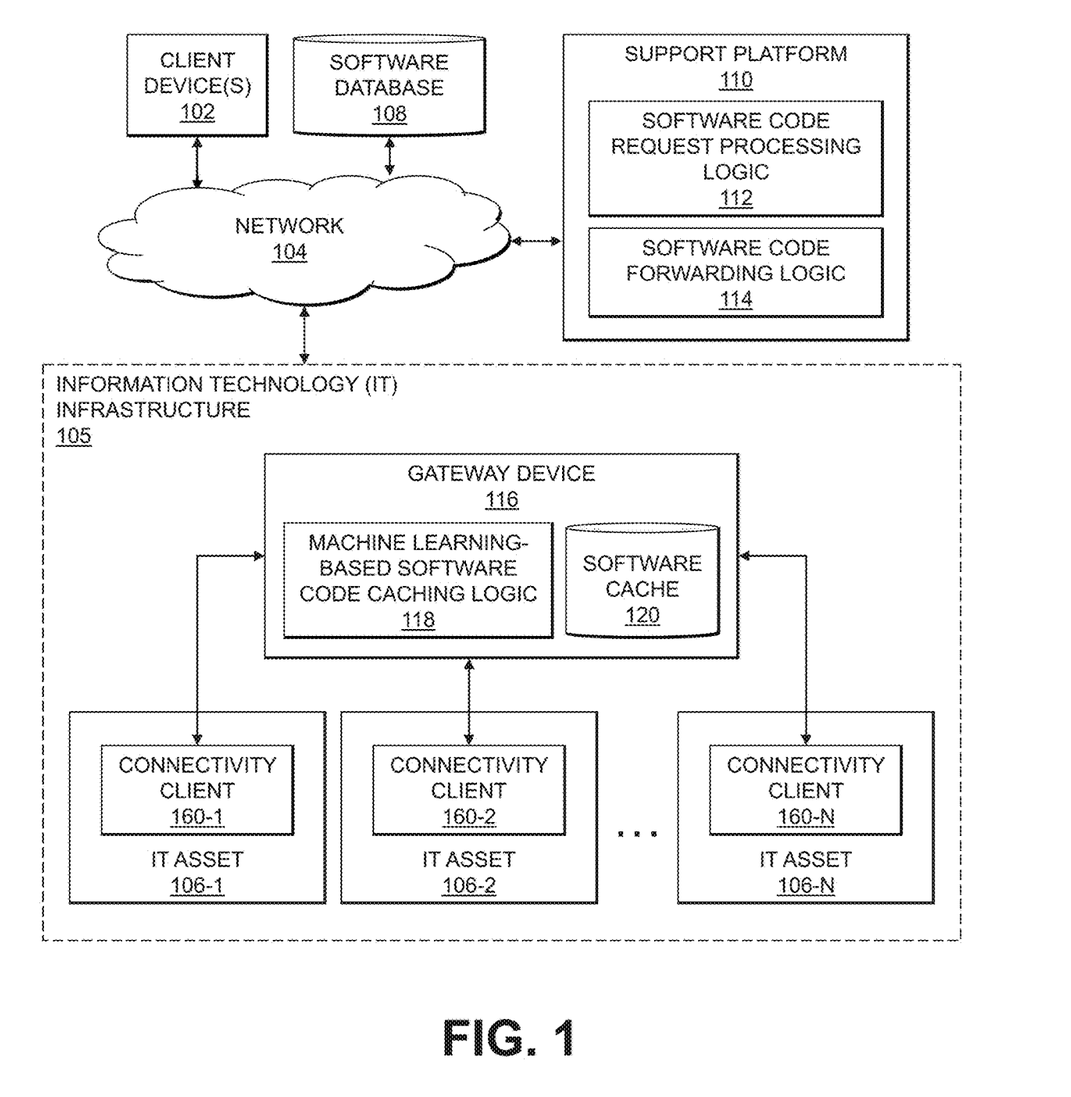
FIG. 1 is a block diagram of an information processing system incorporating functionality for software code caching in a gateway device deployed in an information technology infrastructure environment in an illustrative embodiment.

FIG. 1 shows an information processing system 100 configured in accordance with an illustrative embodiment. The information processing system 100 is assumed to be built on at least one processing platform and provides functionality for software caching in gateway devices deployed in information technology (IT) infrastructure environments. It should be noted that while various embodiments are described with respect to software code that is requested and cached in the form of software packages, this is not a requirement. The software code may take forms other than software packages. The information processing system 100 includes one or more client devices 102 which are coupled to a network 104. Also coupled to the network 104 is an IT infrastructure 105 comprising a set of IT assets 106-1, 106-2, ... 106-N (collectively, IT assets 106) and a gateway device 116, a software database 108, and a support platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the support platform 110 is used for an enterprise system. For example, an enterprise may subscribe to or otherwise utilize the support platform 110 for managing IT assets 106 of the IT infrastructure 105 operated by that enterprise. Users of the enterprise associated with different ones of the client devices 102 may utilize the support platform 110 in order to manage software which is installed on different ones of the IT assets 106. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The software database 108 is configured to store and record various information that is utilized by the support platform 110. Such information may include, for example, software packages or other software code which are available for installation on different ones of the IT assets 106, information characterizing IT asset types of the IT assets 106 and which software packages or other software code have historically been installed on different ones of the IT assets 106 and different IT asset types, etc. In some embodiments, one or more storage systems utilized to implement the software database 108 comprise a scale-out all-flash content addressable storage array or other type of storage array. Various other types of storage systems may be used, and the term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

The support platform 110 may be provided as a cloud service that is accessible by one or more of the client devices 102 to allow users thereof to manage the IT assets 106 of the IT infrastructure 105. The client devices 102 may be configured to access or otherwise utilize the support platform 110 to track and manage installation of software on the IT assets 106. In some embodiments, the client devices 102 are assumed to be associated with system administrators, IT managers or other authorized personnel responsible for managing the IT assets 106. In some embodiments, the IT assets 106 of the IT infrastructure 105 are owned or operated by the same enterprise that operates the support platform 110. In other embodiments, the IT assets 106 of the IT infrastructure 105 may be owned or operated by one or more enterprises different than the enterprise which operates the support platform 110 (e.g., a first enterprise provides support for multiple different customers, business, etc.). Various other examples are possible.

In some embodiments, the client devices 102 and/or the IT assets 106 of the IT infrastructure 105 may implement host agents that are configured for automated transmission of information with the support platform 110. It should be noted that a "host agent" as this term is generally used herein may comprise an automated entity, such as a software entity running on a processing device. Accordingly, a host agent need not be a human entity.

The IT assets 106, the support platform 110 and the gateway device 116 in the FIG. 1 embodiment are each assumed to be implemented using at least one processing device. Each such processing device generally comprises at least one processor and an associated memory, and implements one or more functional modules or logic for controlling certain features of the support platform 110 and/or the gateway device 116. In the FIG. 1 embodiment, the IT assets 106 implement respective instances of connectivity client 160-1, 160-2, . . . 160-N (collectively, connectivity clients 160), the support platform 110 implements software code request processing logic 112 and software code forwarding logic 114 while the gateway device 116 implements machine learning-based software code caching logic 118 and a software cache 120. The connectivity clients 160 running on the IT assets 106 are configured to submit software code requests to the gateway device 116. The gateway device 116 determines if requested software code is cached locally in the software cache 120. If the requested software code is cached locally in the software cache 120, the gateway device 116 returns the requested software code to the connectivity clients 160 of the requesting client devices 102 directly. If the gateway device 116 determines that requested software code is not cached locally in the software cache 120, the gateway devices 116 forwards the software code request to the support platform 110. The software code request processing logic 112 will receive the forwarded software code request, and obtain the requested software code from the software database 108 (e.g., which may comprise or be part of a package server or other type of software repository). The software code forwarding logic 114 then returns the requested software code to the gateway device 116, which in turn provides the requested software code to the connectivity clients 160 of the requesting IT assets 106. The machine learning-based software code caching logic 118 is configured to utilize one or more machine learning algorithms to determine the relative priority of different software code requested by the IT assets, and to store requested software code in the software cache 120 in accordance with the determined relative priorities.

At least portions of the software code request processing logic 112, the software code forwarding logic 114, and the machine learning-based software code caching logic 118 may be implemented at least in part in the form of software that is stored in memory and executed by a processor.

It is to be appreciated that the particular arrangement of the client devices 102, the IT infrastructure 105, the software database 108, the support platform 110 and the gateway device 116 illustrated in the FIG. 1 embodiment is presented by way of example only, and alternative arrangements can be used in other embodiments. As discussed above, for example, the support platform 110 (or portions of components thereof, such as one or more of the software code request processing logic 112 and the software code forwarding logic 114) may in some embodiments be implemented internal to one or more of the client devices 102 and/or the IT infrastructure 105. As another example, although FIG. 1 shows an example where there is a single gateway device 116 in the IT infrastructure 105, in other embodiments there may be multiple gateway devices deployed in an IT infrastructure environment. In some cases, different ones of the gateway devices are in communication with different subsets of the IT assets deployed in an IT infrastructure environment. In other cases, different ones of the gateway devices are responsible for managing different types of software code requests (e.g., requests for operating system-level software packages, application-level software packages, VM or software container packages, microservice software packages, etc.). Various other examples are possible.

The support platform 110 and other portions of the information processing system 100, as will be described in further detail below, may be part of cloud infrastructure.

The support platform 110, the gateway device 116 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the software database 108, the support platform 110 and the gateway device 116 may be implemented on respective distinct processing platforms, although numerous other arrangements are possible. For example, in some embodiments at least portions of the support platform 110 and one or more of the client devices 102, the IT infrastructure 105 and/or the software database 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the software database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 6 and 7.

It is to be understood that the particular set of elements shown in FIG. 1 for software code caching in gateway devices deployed in IT infrastructure environments is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
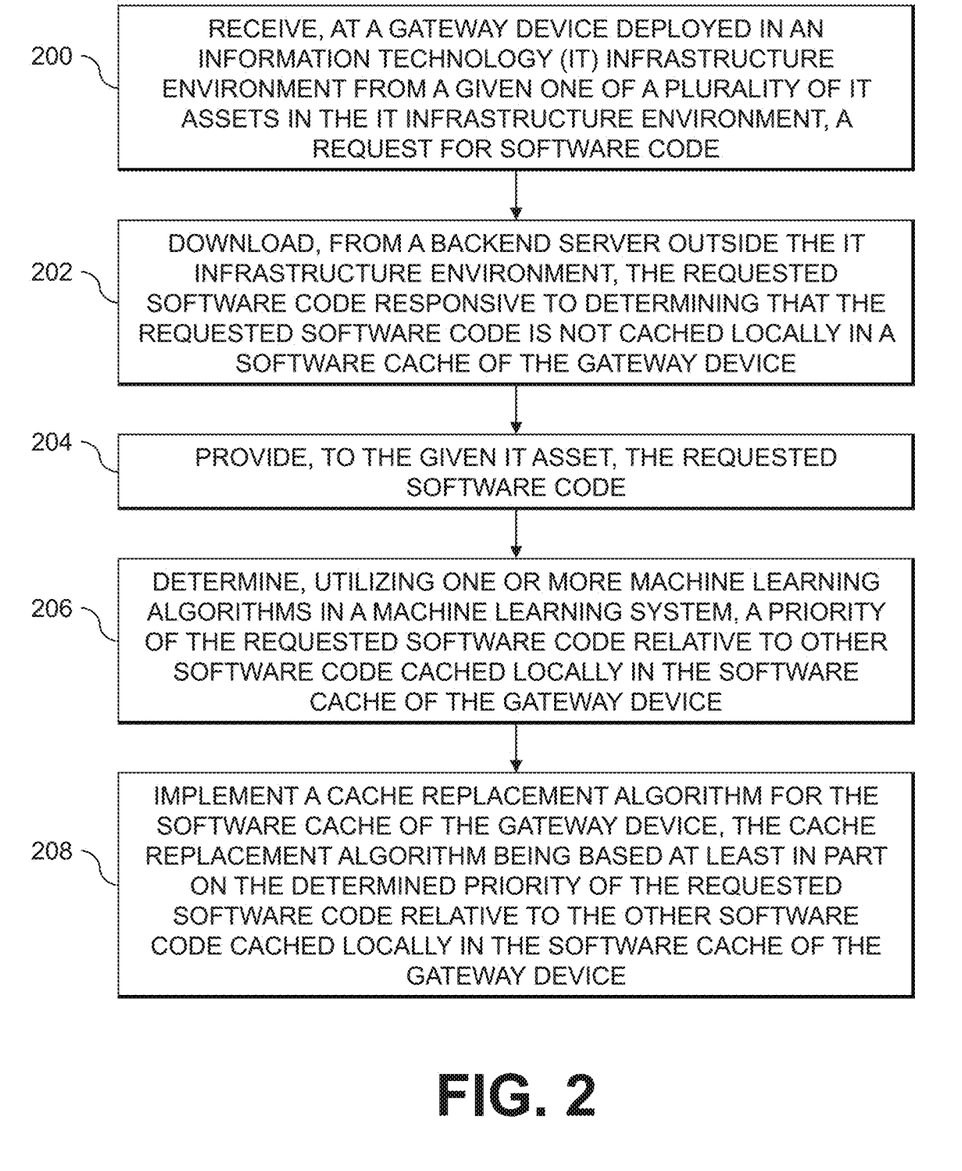
FIG. 2 is a flow diagram of a process for software code caching in a gateway device deployed in an information technology infrastructure environment in an illustrative embodiment.

An exemplary process for software code caching in gateway devices deployed in IT infrastructure environments will now be described in more detail with reference to the flow diagram of FIG. 2. It is to be understood that this particular process is only an example, and that additional or alternative processes for software code caching in gateway devices deployed in IT infrastructure environments may be used in other embodiments.

In this embodiment, the process includes steps 200 through 208. These steps are assumed to be performed by the gateway device 116 utilizing the machine learning-based software code caching logic 118. The process begins with step 200, receiving at a gateway device (e.g., gateway device 116) in an IT infrastructure environment (e.g., IT infrastructure 105) from a given one of a plurality of IT assets (e.g., IT assets 106) in the IT infrastructure environment, a request for software code. The requested software code may comprise an operating system (OS) software package for the given IT asset, one or more applications to be run on the given IT asset, a software container or VM to be run on the given IT asset, a microservice to be deployed on the given IT asset, etc. In step 202, the requested software code is downloaded from a backend server (e.g., support platform 110) outside the IT infrastructure environment responsive to determining that that the requested software code is not cached locally in a software cache (e.g., software cache 120) of the gateway device. The requested software code is provided to the given IT asset in step 204.

In step 206, a priority of the requested software code relative to other software code cached locally in the software cache of the gateway device is determined utilizing one or more machine learning algorithms in a machine learning system (e.g., machine learning-based software code caching logic 118). A cache replacement algorithm is implemented for the software cache of the gateway device in step 208. The cache replacement algorithm is based at least in part on the determined priority of the requested software code relative to the other software code cached locally in the software cache of the gateway device. Determining the priority of the requested software code relative to the other software code cached locally in the software cache of the gateway device is based at least in part on at least one of: a number of IT assets in the plurality of IT assets in the IT infrastructure environment that the requested software code could be installed on; a number of IT assets in the plurality of IT assets in the IT infrastructure environment that the requested software code has already been installed on; a current version of IT assets in the plurality of IT assets in the IT infrastructure environment that the requested software code is able to be installed on; a size of the requested software code; an age of the requested software code; a severity of the requested software code; a criticality of the requested software code; how many other pieces of software code are currently cached locally in the software cache of the gateway device for the given IT asset; and an overall size of the other pieces of software code which are currently cached locally in the software cache of the gateway device for the given IT asset.

Determining the priority of the requested software code relative to the other software code cached locally in the software cache of the gateway device may also or alternatively be based at least in part on learned behavior regarding installation of software code on different ones of the plurality of IT assets in the IT infrastructure environment. The learned behavior may specify at least one of: ages of software code which is installed on different ones of the plurality of IT assets in the IT infrastructure environment; whether most up-to-date versions of software code are installed on different ones of the plurality of IT assets in the IT infrastructure environment; and relative frequency of updates for different ones of the plurality of IT assets in the IT infrastructure environment.

Determining the priority of the requested software code relative to the other software code cached locally in the software cache of the gateway device may also or alternatively be based at least in part on tracking software code which is removed from the software cache of the gateway device by the cache replacement algorithm and which are later re-downloaded from the backend server outside the IT infrastructure environment.

Operators of IT infrastructure or other end-users may have many IT assets of the same IT asset type (e.g., hardware devices, software instances, combinations thereof, etc.), and will typically want to have those IT assets running on the same code version. In a conventional approach, this means downloading software code, such as in the form of a software package, for each of the IT assets, even if it is the same software package for multiple ones of the IT assets. As a workaround, an operator of IT infrastructure or another end-user may manually download the software package through a portal, and then manually apply that software package to each individual IT asset. This means that there will either be a lot of duplicated data downloaded across the network (e.g., which uses significant time, bandwidth, etc.), or a painstaking arduous process for manually updating IT assets must be used.

Operators of IT infrastructure or other end-users that have many IT assets which would be most adversely affected by such a predicament, in most cases, may have a gateway appliance installed in their local environment. Connectivity clients may be embedded in IT assets, with such connectivity clients being configured to utilize the gateway appliance to facilitate communication with one or more back-end systems, such as a support platform. Illustrative embodiments provide technical solutions which enable gateway appliances deployed at local environments to facilitate download and distribution of software packages to IT assets which are connected to the gateway appliances. In some embodiments, the gateway appliances are configured to utilize machine learning to predict and prioritize which software packages should be cached locally at the gateway appliances. The technical solutions thus provide various technical advantages, including but not limited to: reducing bandwidth in downloading redundant packages; avoiding manual processes for upgrading individual IT assets; speeding up the process of updating multiple IT assets; simplifying the management of multiple IT asset updates; predicting upgrade patterns to have software packages staged to gateway appliances when needed; providing a unified repository/software package cache for local software packages and network-accessible (e.g., cloud) software packages; recommending optimal combinations of software package versions for a particular combination of IT assets; etc.

The technical solutions provide a novel approach for using gateway appliances and connectivity clients embedded on IT assets to allow for software package caching locally at the gateway appliances which reduces bandwidth usage and manual effort in upgrading multiple IT assets of the same type to a same version of a software package. Software packages may be complete, operating system (OS)-level product updates, new versions of software applications running on top of OSes, new versions of software containers, VMs, microservices, etc. A gateway appliance will download any needed software packages from a back-end support platform such as software package server (e.g., using a Common Update platform). The gateway appliance will keep the needed software packages as prioritized by a machine learning caching engine (MCE). The MCE may take into account and utilize various input factors for a given software package, such as: a number of IT assets that the given software package could be installed on; a number of IT assets that the given software package is already installed on (e.g., to predict a likelihood of the given software package being installed on remaining IT assets); a current version of the IT assets that the given software package could be installed on; other cached software packages for a same specified IT asset type as the given software package; a size of the given software package; an age of the given software package; customer or other end-user behavior on which software packages are likely to be installed on different IT assets (e.g., the most up-to-date software packages, the next to most up-to-date or "n-1" software packages, those released some designated threshold time ago such as 6 months, etc.); IT assets and IT asset types which customers or other end-users upgrade more or less frequently; severity or criticality of software package updates; etc.

The various inputs or other factors allow the MCE to determine and set a prioritized order of software packages to keep in a local package cache of a gateway appliance. It should be noted that this prioritized order may be ever-changing, based on new software packages downloaded to gateway appliances, installation of software packages on IT assets, etc. Should a gateway appliance reach a limit of space for cached software packages, packages may be removed from the cache based on the prioritized order. The MCE also keeps track of removed software packages to validate whether they are not needed for the future. For example, if a software package is removed and later has to be downloaded again, the MCE would use this information to better predict future use cases (e.g., for the same software package, for other software packages of a same type or which are to be installed on the same types of IT assets, etc.).

Figure 3:
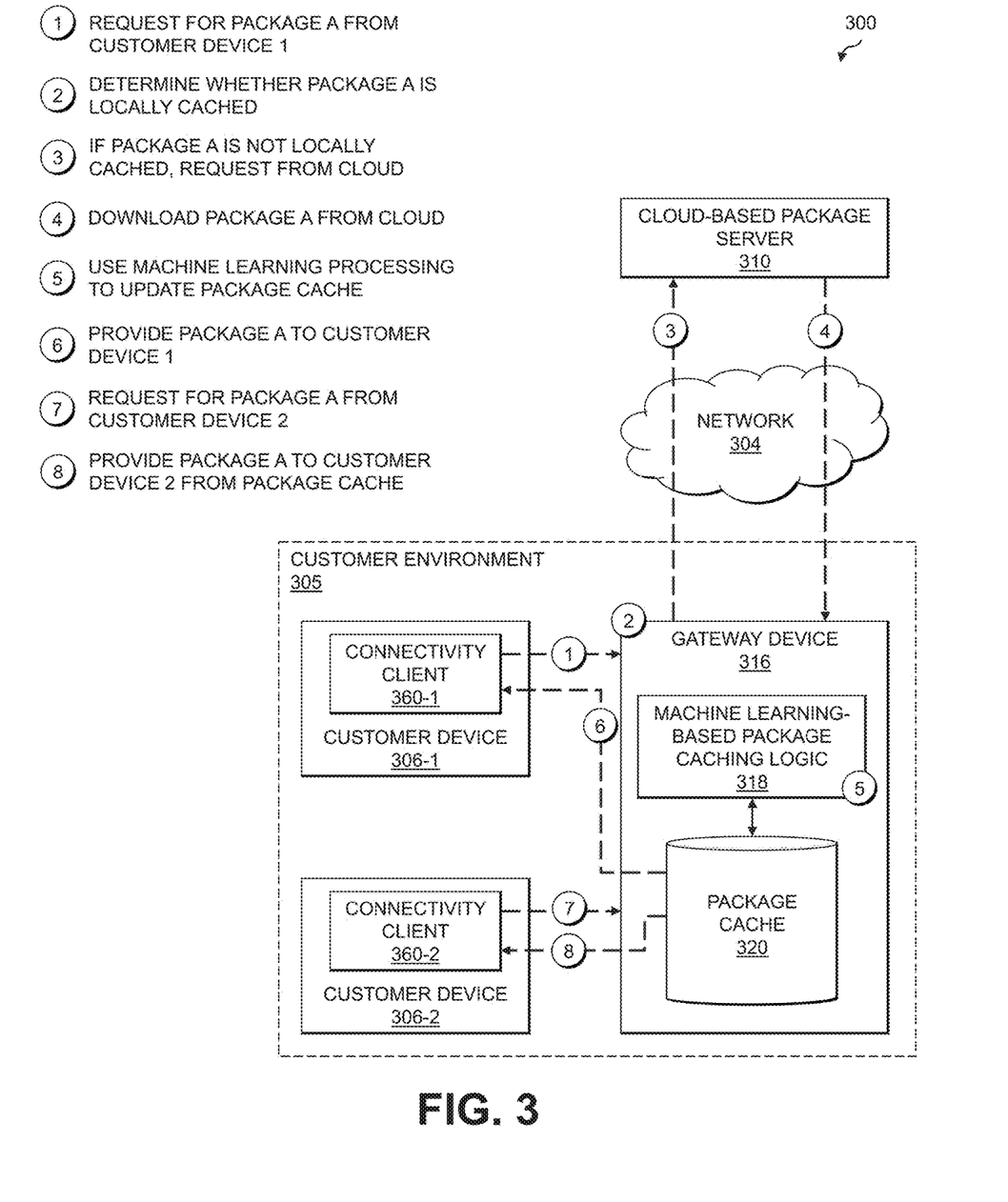
FIG. 3 shows a system flow for processing with a gateway device deployed in a customer environment in an illustrative embodiment.

FIG. 3 shows a system flow 300 for software package caching utilizing a gateway device 316 which is deployed in a customer environment 305. The customer environment 305 also includes a plurality of customer devices (e.g., IT assets), of which two are shown—customer device 306-1 and customer device 306-2. The customer devices 306-1 and 306-2 implement respective connectivity clients 360-1 and 360-2, which are configured for communication with the gateway device 316. The gateway device 316 implements machine learning-based package caching logic 318 and a package cache 320. The machine learning-based package caching logic 318 implements an application programming interface (API) which allows the connectivity clients 360-1 and 360-2 of the customer devices 306-1 and 306-2 to request software packages from the gateway device 316. This is in contrast with conventional approaches, where the customer devices 306-1 and 306-2 would request software packages directly from a back-end system or support platform such as cloud-based package server 310, via network 304. The gateway device 316 will call directly to the cloud-based package server 310 on behalf of the customer devices 306-1 and 306-2. The machine learning-based package caching logic 318 processes gateway-downloaded software packages, processes them, and sorts them within the package cache 320 based on various criteria. The package cache 320 provides a data store for holding various software packages. The machine learning-based package caching logic 318 further implements a package processing service to assess whether requested software packages have been cached in the package cache 320, or whether requested software packages need to be pulled from the cloud-based package server 310.

The system flow 300 includes steps 1-8, described below:
1. Connectivity client 360-1 of customer device 306-1 issues a request to the gateway device 316 for software package A;
2. The gateway device 316 uses the package processing service implemented by the machine learning-based package caching logic 318 to determine whether the requested software package A is locally cached in the package cache 320;
3. If the requested software package A is not locally cached in the package cache 320, the gateway device 316 sends a request for software package A to the cloud-based package server 310;
4. The requested software package A is downloaded from the cloud-based package server 310 to the gateway device 316;
5. The machine learning-based package caching logic 318 uses one or more machine learning models to update the package cache 320 (e.g., to determine whether the downloaded software package A should be stored in the package cache 320, to update priorities of the software package A and other software packages currently being stored in the package cache 320, to evict software packages from the package cache 320 as needed, etc.);
6. The gateway device 316 provides the requested software package A to the connectivity client 360-1 of the requesting customer device 306-1;
7. Connectivity client 360-2 of customer device 306-2 issues a request to the gateway device 316 for the software package A; and
8. The gateway device 316 provides the requested software package A from the package cache 320 to the connectivity client 360-2 of the customer device 306-2.

It should be noted that, if in step 2 it is determined that the software package A is already locally cached in the package cache 320, steps 3 and 4 may be omitted. Step 5 would still be performed however (e.g., to update priorities of the software package A and other software packages currently being stored in the package cache 320).

Figure 4:
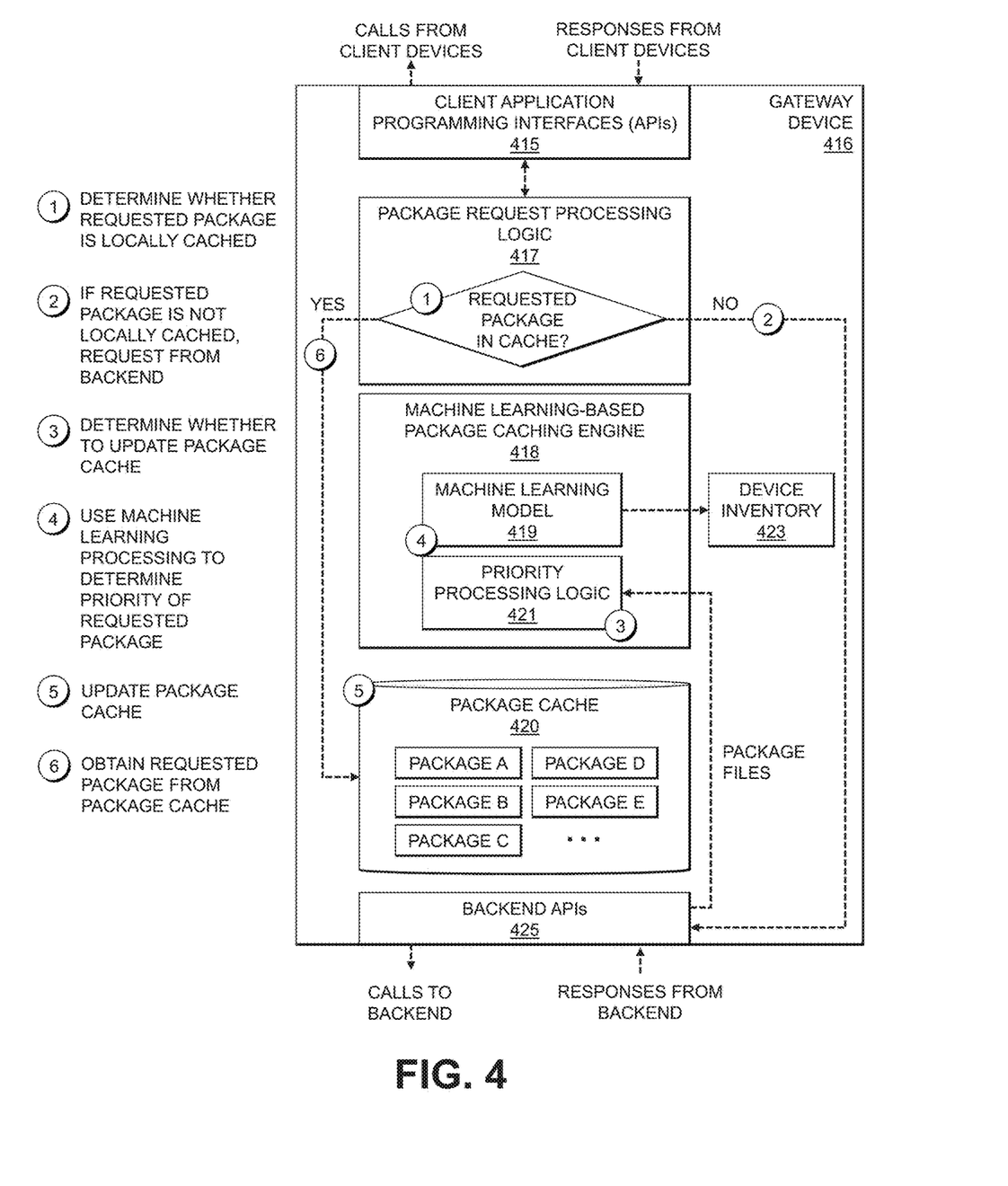
FIG. 4 shows a system flow for processing performed utilizing a gateway device in an illustrative embodiment.

FIG. 4 shows a system flow 400 for processing performed by a gateway device 416 implementing one or more client APIs 415, package request processing logic 417, machine learning-based package caching engine 418 comprising a machine learning model 419 and priority processing logic 421, a package cache 420, a device inventory 423, and backend APIs 425. The client APIs 415 receive calls from client devices (e.g., requests for software packages) and receive responses from client devices. The package request processing logic 417 is configured to analyze software package requests from client devices (received via the client APIs 415) to determine whether requested software packages are stored in the package cache 420. The machine learning-based package caching engine 418 uses the machine learning model 419 to determine priorities of different software packages, with such priorities being analyzed via the priority processing logic 421 to control which software packages are maintained in the package cache 420. The machine learning model 419 may take into account the device inventory 423, which includes information associated with a set of client devices which are coupled to the gateway device 416. Such information may include, but is not limited to, IT asset types of the client devices, installed software packages on the client devices, installation history of software packages for the client devices, etc. The package cache 420 stores a set of software packages as determined or controlled by the priority processing logic 421. The backend APIs 425 provide an interface enabling the gateway device 416 to make calls and receive responses from one or more backend servers (e.g., a support platform, a package server, etc.).

The system flow 400 includes steps 1-6, described below:
1. The package request processing logic 417 receives a request for a software package from a client device via the client APIs 415, and determines whether the requested package is locally cached in the package cache 420;
2. If the package request processing logic 417 determines that the requested package is not locally cached in the package cache 420, the backend APIs 425 are used to request the software package from a backend server (e.g., a support platform, a package server, etc.), which is returned to the requesting client device via the client APIs 415 and also provided to the machine learning-based package caching engine 418 for processing;
3. The machine learning-based package caching engine 418 uses the priority processing logic 421 to determine whether to update the package cache 420 with the requested software package;
4. The machine learning-based package caching engine 418 uses the machine learning model 419 to determine the priority of the requested software package;
5. The machine learning-based package caching engine 418 updates the package cache 420 as necessary based on the determined priority of the requested software package relative to other software packages stored in the package cache 420; and 6. If the package request processing logic 417 determines that the requested package is locally stored in the package cache 420, the requested software package is retrieved from the package cache 420 and then returned to the requesting client device via the client APIs 415. It should be noted that, following step 6, steps 3-5 may also be performed to update the priority of the requested software package which is already stored in the package cache 420.

The machine learning-based package caching engine 418 uses the machine learning model 419 to determine the priorities of different software packages. The machine learning model 419 may take into account various inputs or factors to determine a ranking of priorities of different software packages (e.g., from a highest priority to a lowest priority, with the higher priority software packages being maintained in the package cache 420 as space allows). The inputs or factors used by the machine learning model 419 for a given software package may include, but are not limited to: a number of IT assets that the given software package could be installed on; a number of IT assets that the given software package is already installed on (e.g., to predict a likelihood of the given software package being installed on remaining IT assets); a current version of the IT assets that the given software package could be installed on; other cached software packages for a same specified IT asset type as the given software package; a size of the given software package; an age of the given software package; customer or other end-user behavior on which software packages are likely to be installed on different IT assets (e.g., the most up-to-date software packages, the next to most up-to-date or "n-1" software packages, those released some designated threshold time ago such as 6 months, etc.); IT assets and IT asset types which customers or other end-users upgrade more or less frequently; severity or criticality of software package updates; classification of the given software package (e.g., target, long term support (LTS), latest, etc.); etc. The machine learning-based package caching engine 418 also keeps track of removed software packages to validate if they are not needed in the future. For example, if a software package is removed and later has to be downloaded again, this information may be used to update the machine learning model 419 to better predict future use cases.

Figure 5A:
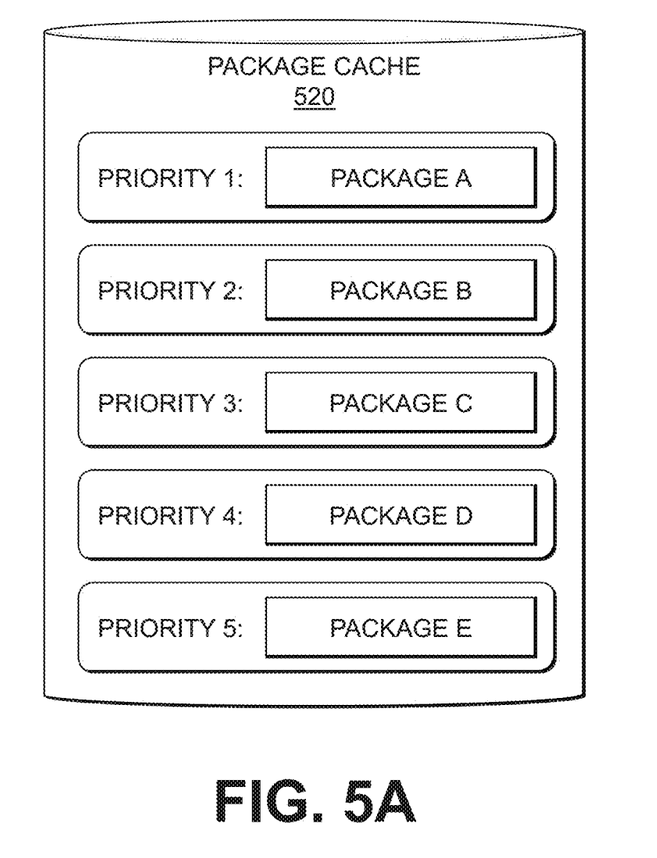
FIGS. 5A and 5B show a package cache before and after a priority update operation in an illustrative embodiment.
Figure 5B:
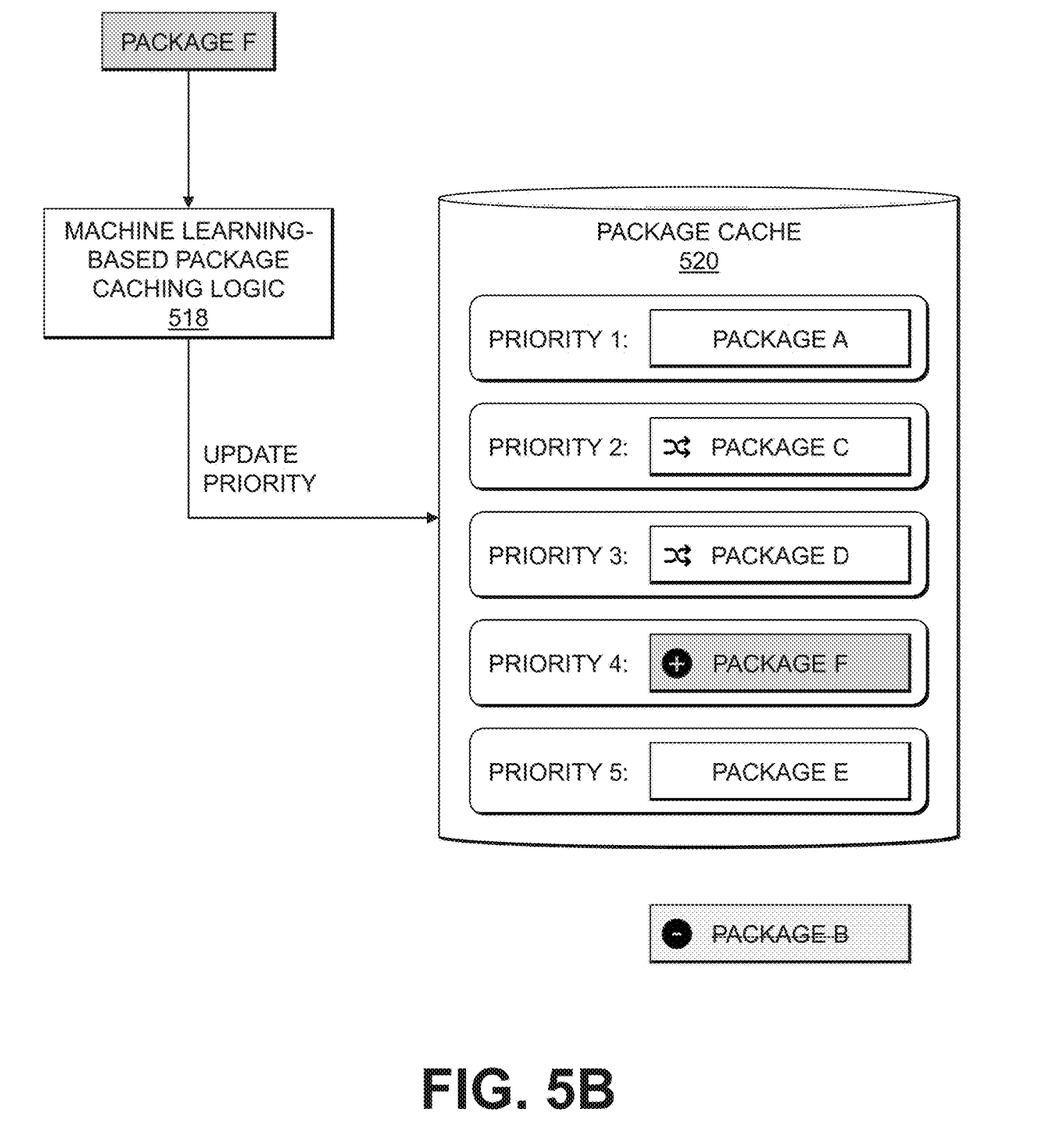

FIGS. 5A and 5B illustrate updating of a package cache 520 in accordance with a cache replacement algorithm that takes into account determined relative priority of different software packages. FIG. 5A shows a package cache 520 storing a set of packages A through E with priorities 1 through 5, respectively. FIG. 5B shows how the package cache 520 is updated when a new software package F is requested and downloaded by an associated gateway appliance from a backend server. Machine learning-based package caching logic 518 will analyze the software package F to determine its relative priority to the software packages A through E which are currently stored in the package cache 520. In the FIG. 5B example, the software package F is assigned priority 4, software package B is marked for removal from the package cache 520, software package C is slotted to priority 2, and software package D is slotted to priority 3, while software packages A and E keep their same priorities.

The technical solutions described herein enable gateway devices to leverage knowledge about the IT assets to which they are connected to intelligently set the priority of different software packages for storage in package caches of the gateway devices located locally at IT infrastructure environments (e.g., customer or other end-user data centers). While many cache replacement algorithms use a first-in, first-out (FIFO) approach where data items simply "age out" of a cache, such an approach is not suitable for managing which software packages should be maintained in a package cache of a gateway device (e.g., located locally in a customer or other end-user's IT infrastructure environment) as a FIFO approach requires more manual effort for the user, and can increate bandwidth usage by re-downloading software packages which aged out before all IT assets needing such software packages have been updated. For example, for a user with a large number of IT assets that need to be updated, it may take a long time (e.g., months) to have maintenance windows for all of them.

The technical solutions described herein can provide significant technical advantages. Consider, for example, a customer which needs to update 300 servers to a particular software version 4.5.6, where the software version 4.5.6 update package is 1 gigabyte (GB). A conventional approach which has each server directly download the software version 4.5.6 update package results in 300 downloads, with 299 of those downloads being a complete duplicate wasting 299 GB of network bandwidth. Using the technical solutions described herein, the software version 4.5.6 update package may be downloaded once to a gateway device, which can store the software version 4.5.6 update package in a local package cache and serve the cached software version 4.5.6 update package to the remaining 299 servers without using any additional network bandwidth outside the customer's local IT infrastructure environment.

In some embodiments, IT assets may be migrated to a Common Update Platform (CUP), which is a service that operates in a backend server (e.g., a support platform) and which manages software packages and notifications rollouts for different IT assets. The CUP service may send a manifest of all available software packages to different IT assets. End-users of the IT assets may inspect or view the manifest to decide which software packages to download. In some cases, end-users may configure IT assets to automatically download at least some designated types of software packages (e.g., software packages with at least a threshold criticality/severity, software packages associated with different components or functionality of the IT assets, etc.). For IT assets which leverage CUP, a connectivity client embedded into such IT assets will receive update manifests containing all the software packages assigned to and available for that specific IT asset instance. When the IT asset calls the connectivity client to stage one or more updates (or when initiated from a cloud or other back-end server such as a support platform), the connectivity client downloads the software packages either directly from a package server (e.g., if that IT asset is configured for direct connection) or via a gateway (e.g., if a gateway device has been setup for the IT asset).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to provide functionality for software code caching in gateway devices deployed in IT infrastructure environments will now be described in greater detail with reference to FIGS. 6 and 7. Although described in the context of system 100, these platforms may also be used to implement at least portions of other information processing systems in other embodiments.

Figure 6:
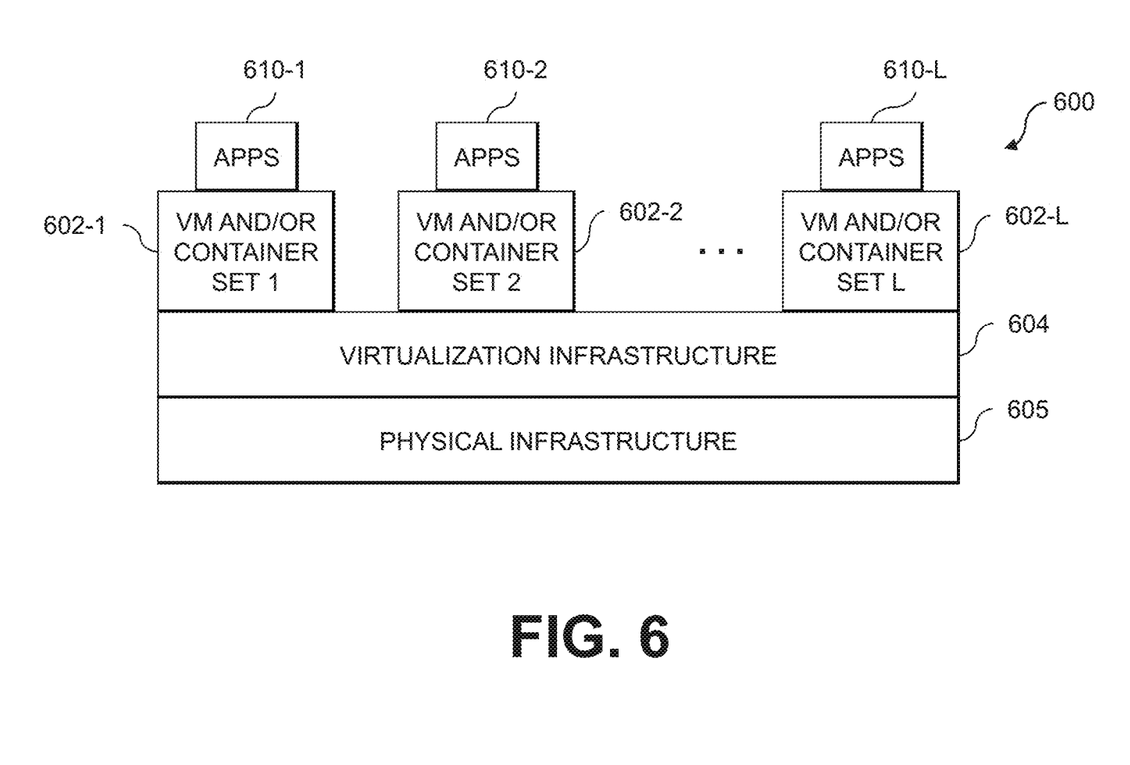
FIGS. 6 and 7 show examples of processing platforms that may be utilized to implement at least a portion of an information processing system in illustrative embodiments.
Figure 7:
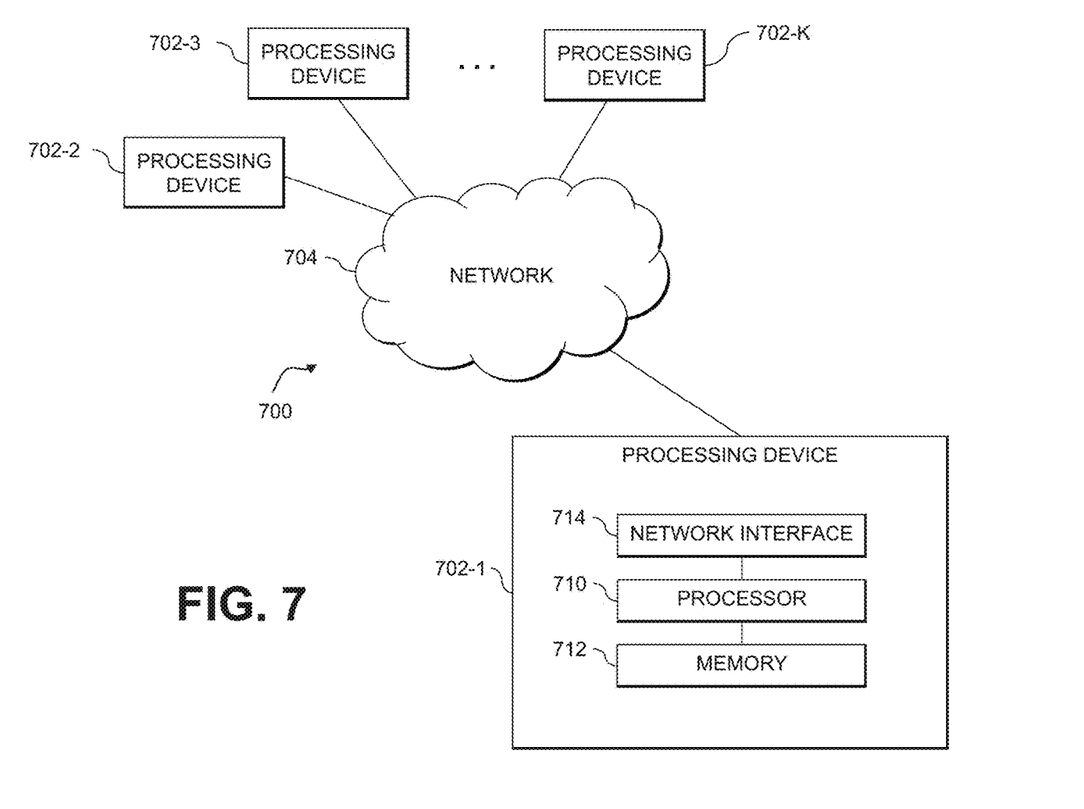

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide host-based locality determination functionality in a distributed storage system of the type described above using one or more processes running on a given one of the VMs. For example, each of the VMs can implement logic instances and/or other components for implementing functionality associated with host-based locality determination and associated path selection in the system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide host-based locality determination functionality in a distributed storage system of the type described above. For example, a container host device supporting multiple containers of one or more container sets can implement logic instances and/or other components for implementing functionality associated with host-based locality determination and associated path selection in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for software code caching in gateway devices deployed in IT infrastructure environments as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to receive, at a gateway device deployed in an information technology infrastructure environment from a given one of a plurality of information technology assets in the information technology infrastructure environment, a request for software code;
   to download, from a backend server outside the information technology infrastructure environment, the requested software code responsive to determining that the requested software code is not cached locally in a software cache of the gateway device;
   to provide, to the given information technology asset, the requested software code;
   to determine, utilizing one or more machine learning algorithms in a machine learning system implemented by the processor and the memory of the at least one processing device, a priority of the requested software code relative to other software code cached locally in the software cache of the gateway device; and
   to implement a cache replacement algorithm for the software cache of the gateway device, the cache replacement algorithm being based at least in part on the determined priority of the requested software code relative to the other software code cached locally in the software cache of the gateway device.

2. The apparatus of claim 1, wherein the requested software code comprises an operating system software package for the given information technology asset.

3. The apparatus of claim 1, wherein the requested software code comprises a software container to be run on the given information technology asset.

4. The apparatus of claim 1, wherein the requested software code comprises a microservice to be deployed on the given information technology asset.

5. The apparatus of claim 1, wherein determining the priority of the requested software code relative to the other software code cached locally in the software cache of the gateway device is based at least in part on:
   a number of information technology assets in the plurality of information technology assets in the information technology infrastructure environment that the requested software code could be installed on; and
   a number of information technology assets in the plurality of information technology assets in the information technology infrastructure environment that the requested software code has already been installed on.

6. The apparatus of claim 1, wherein determining the priority of the requested software code relative to the other software code cached locally in the software cache of the gateway device is based at least in part on a current software version of information technology assets in the plurality of information technology assets in the information technology infrastructure environment that the requested software code is able to be installed on.

7. The apparatus of claim 1, wherein determining the priority of the requested software code relative to the other software code cached locally in the software cache of the gateway device is based at least in part on at least one of:
   a size of the requested software code; and
   an age of the requested software code.

8. The apparatus of claim 1, wherein determining the priority of the requested software code relative to the other software code cached locally in the software cache of the gateway device is based at least in part on at least one of:
   a severity of the requested software code; and
   a criticality of the requested software code.

9. The apparatus of claim 1, wherein determining the priority of the requested software code relative to the other software code cached locally in the software cache of the gateway device is based at least in part on how many other pieces of software code are currently cached locally in the software cache of the gateway device for the given information technology asset.

10. The apparatus of claim 1, wherein determining the priority of the requested software code relative to the other software code cached locally in the software cache of the gateway device is based at least in part on learned behavior regarding installation of software code on different ones of the plurality of information technology assets in the information technology infrastructure environment.

11. The apparatus of claim 10, wherein the learned behavior specifies ages of software code which are installed on different ones of the plurality of information technology assets in the information technology infrastructure environment.

12. The apparatus of claim 10, wherein the learned behavior specifies whether most up-to-date versions of software code are installed on different ones of the plurality of information technology assets in the information technology infrastructure environment.

13. The apparatus of claim 10, wherein the learned behavior specifies relative frequency of software updates for different ones of the plurality of information technology assets in the information technology infrastructure environment.

14. The apparatus of claim 1, wherein determining the priority of the requested software code relative to the other software code cached locally in the software cache of the gateway device is based at least in part on tracking software code which is removed from the software cache of the gateway device by the cache replacement algorithm and which is later re-downloaded from the backend server outside the information technology infrastructure environment.

15. A computer program product comprising a non-transitory processor-readable storage medium having stored therein program code of one or more software programs, wherein the program code when executed by at least one processing device comprising a processor coupled to a memory, causes the at least one processing device:

to receive, at a gateway device deployed in an information technology infrastructure environment from a given one of a plurality of information technology assets in the information technology infrastructure environment, a request for software code;
to download, from a backend server outside the information technology infrastructure environment, the requested software code responsive to determining that the requested software code is not cached locally in a software cache of the gateway device;
to provide, to the given information technology asset, the requested software code;
to determine, utilizing one or more machine learning algorithms in a machine learning system implemented by the processor and the memory of the at least one processing device, a priority of the requested software code relative to other software code cached locally in the software cache of the gateway device; and
to implement a cache replacement algorithm for the software cache of the gateway device, the cache replacement algorithm being based at least in part on the determined priority of the requested software code relative to the other software code cached locally in the software cache of the gateway device.

16. The computer program product of claim 15, wherein determining the priority of the requested software code relative to the other software code cached locally in the software cache of the gateway device is based at least in part on learned behavior regarding installation of software code on different ones of the plurality of information technology assets in the information technology infrastructure environment.

17. The computer program product of claim 15, wherein determining the priority of the requested software code relative to the other software code cached locally in the software cache of the gateway device is based at least in part on tracking software code which is removed from the software cache of the gateway device by the cache replacement algorithm and which is later re-downloaded from the backend server outside the information technology infrastructure environment.

18. A method comprising:
receiving, at a gateway device deployed in an information technology infrastructure environment from a given one of a plurality of information technology assets in the information technology infrastructure environment, a request for software code;
downloading, from a backend server outside the information technology infrastructure environment, the requested software code responsive to determining that the requested software code is not cached locally in a software cache of the gateway device;
providing, to the given information technology asset, the requested software code;
determining, utilizing one or more machine learning algorithms in a machine learning system, a priority of the requested software code relative to other software code cached locally in the software cache of the gateway device; and
implementing a cache replacement algorithm for the software cache of the gateway device, the cache replacement algorithm being based at least in part on the determined priority of the requested software code relative to the other software code cached locally in the software cache of the gateway device;
wherein the method is performed by at least one processing device comprising a processor coupled to a memory, the at least one processing device implementing the machine learning system.

19. The method of claim 18, wherein determining the priority of the requested software code relative to the other software code cached locally in the software cache of the gateway device is based at least in part on learned behavior regarding installation of software code on different ones of the plurality of information technology assets in the information technology infrastructure environment.

20. The method of claim 18, wherein determining the priority of the requested software code relative to the other software code cached locally in the software cache of the gateway device is based at least in part on tracking software code which is removed from the software cache of the gateway device by the cache replacement algorithm and which is later re-downloaded from the backend server outside the information technology infrastructure environment.

\* \* \* \* \*